United States Patent
Tsoukalas et al.

(10) Patent No.: US 10,678,678 B1
(45) Date of Patent: Jun. 9, 2020

(54) ORDERED TEST EXECUTION BASED ON TEST COVERAGE

(71) Applicant: Amazon Technologies, Inc., Seattle, WA (US)

(72) Inventors: Kathleen Joanna Tsoukalas, Seattle, WA (US); Carlos Alejandro Arguelles, Shoreline, WA (US); Sichao Shi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 43 days.

(21) Appl. No.: 15/918,915

(22) Filed: Mar. 12, 2018

(51) Int. Cl.
*G06F 11/36* (2006.01)
*G06F 8/71* (2018.01)

(52) U.S. Cl.
CPC ............ *G06F 11/3676* (2013.01); *G06F 8/71* (2013.01); *G06F 11/368* (2013.01); *G06F 11/3688* (2013.01)

(58) Field of Classification Search
CPC .............................. G06F 11/3676; G06F 8/71
USPC .................................................. 717/124–135
See application file for complete search history.

(56) References Cited

U.S. PATENT DOCUMENTS

| | | | |
|---|---|---|---|
| 6,031,990 A | 2/2000 | Sivakumar et al. | |
| 8,458,669 B2 | 6/2013 | Glowaty | |
| 8,495,574 B2 | 7/2013 | Harding et al. | |
| 8,745,592 B1 * | 6/2014 | Ormandy | G06F 11/3684 717/124 |
| 8,806,450 B1 * | 8/2014 | Maharana | G06F 11/3688 717/133 |
| 8,850,270 B2 | 9/2014 | Heiper et al. | |
| 8,892,953 B2 | 11/2014 | Frohlich et al. | |
| 8,898,639 B2 | 11/2014 | Lawrance et al. | |
| 9,275,246 B2 * | 3/2016 | Haviv | G06F 8/49 |
| 9,734,043 B2 * | 8/2017 | Crova | G06F 11/3672 |
| 10,073,763 B1 * | 9/2018 | Raman | G06F 11/3688 |
| 2013/0019126 A1 * | 1/2013 | Frohlich | G06F 11/3688 714/38.1 |
| 2014/0025997 A1 * | 1/2014 | Heiper | G06F 11/3676 714/38.1 |

OTHER PUBLICATIONS

Hailpern, Brent, and Padmanabhan Santhanam. "Software debugging, testing, and verification." IBM Systems Journal41.1 (2002): pp. 4-12. (Year: 2002).*

(Continued)

*Primary Examiner* — Satish Rampuria
(74) *Attorney, Agent, or Firm* — Robert C. Kowert; Kowert, Hood, Munyon, Rankin & Goetzel, P.C.

(57) ABSTRACT

Methods, systems, and computer-readable media for ordered test execution based on code coverage are disclosed. A suite of tests are executed on a first version of program code to generate data indicative of code coverage of respective tests with respect to the program code. A mapping of the tests to the program code is determined based at least in part on the data indicative of code coverage and is stored. The mapping comprises data indicative of one or more portions of the program code exercised by respective tests from the suite. Based at least in part on the mapping of the tests to the program code and on data indicative of one or more modified or new portions of a second version of the program code, a subset of the tests is determined that are likely to be exercised by the second version of the program code.

20 Claims, 9 Drawing Sheets

(56) References Cited

OTHER PUBLICATIONS

Zimmerman, Ray Daniel, Carlos Edmundo Murillo-Sánchez, and Robert John Thomas. "MATPOWER: Steady-state operations, planning, and analysis tools for power systems research and education." IEEE Transactions on power systems 26.1 (2010): pp. 12-19. (Year: 2010).*

Malik, Haroon, Hadi Hemmati, and Ahmed E. Hassan. "Automatic detection of performance deviations in the load testing of large scale systems." Proceedings of the 2013 International Conference on Software Engineering. IEEE Press, 2013. pp. 1012-1021 (Year: 2013).*

Rauf, Abdul, et al. "Automated GUI test coverage analysis using GA." 2010 Seventh International Conference on Information Technology: New Generations. IEEE, 2010.pp. 1057-1062 (Year: 2010).*

Moundanos, Dinos, Jacob A. Abraham, and Yatin Vasant Hoskote. "Abstraction techniques for validation coverage analysis and test generation." IEEE Transactions on Computers 47.1 (1998): pp. 2-14. (Year: 1998).*

Ho, Richard C., and Mark A. Horowitz. "Validation coverage analysis for complex digital designs." Proceedings of International Conference on Computer Aided Design. IEEE, 1996.pp. 146-151 (Year: 1996).*

"Measuring Code Quality With Test Coverage Metrics", ReQtest. com, May 2017, Source: https://reqtest.com/testing-blog/test-coverage-metrics/, pp. 1-12.

U.S. Appl. No. 14/570,943, filed Dec. 15, 2014, David Robert Griffin et al.

* cited by examiner

ORDERED TEST EXECUTION BASED ON TEST COVERAGE

BACKGROUND

Large-scale computing systems, such as those associated with network-based production services, have become widely available in recent years. Examples of such systems include online merchants, internet service providers, online businesses such as photo processing services, corporate networks, cloud computing services, web-based hosting services, etc. These entities may maintain large numbers of computing devices (e.g., thousands of hosts) which are hosted in geographically separate locations and which are configured to process large quantities (e.g., millions) of client requests daily or even hourly. Complex systems may include many services that interact with one another in varied ways.

Automated testing of such services is an increasingly important part of the software development process. As part of the build process and also as part of the deployment process, a suite of tests may be run to verify the expected operation of the software. However, running a large suite of tests may take a significant amount of time, e.g., tens of minutes to multiple hours. While the software is being tested, a developer may be forced to stop work on the project for the duration of the entire suite of tests. The time taken to run the suite of tests may also limit the number of feedback cycles for a developer in a given period of time. If a developer continues writing code while a program is being tested, only to find that the tests eventually fail, then the developer may need to spend additional time to undo or modify the recent work to address the issues revealed by the failed tests. Accordingly, in large organizations with thousands of developers, automated testing of software builds may result in developer inefficiency on a large scale.

Figure 1:
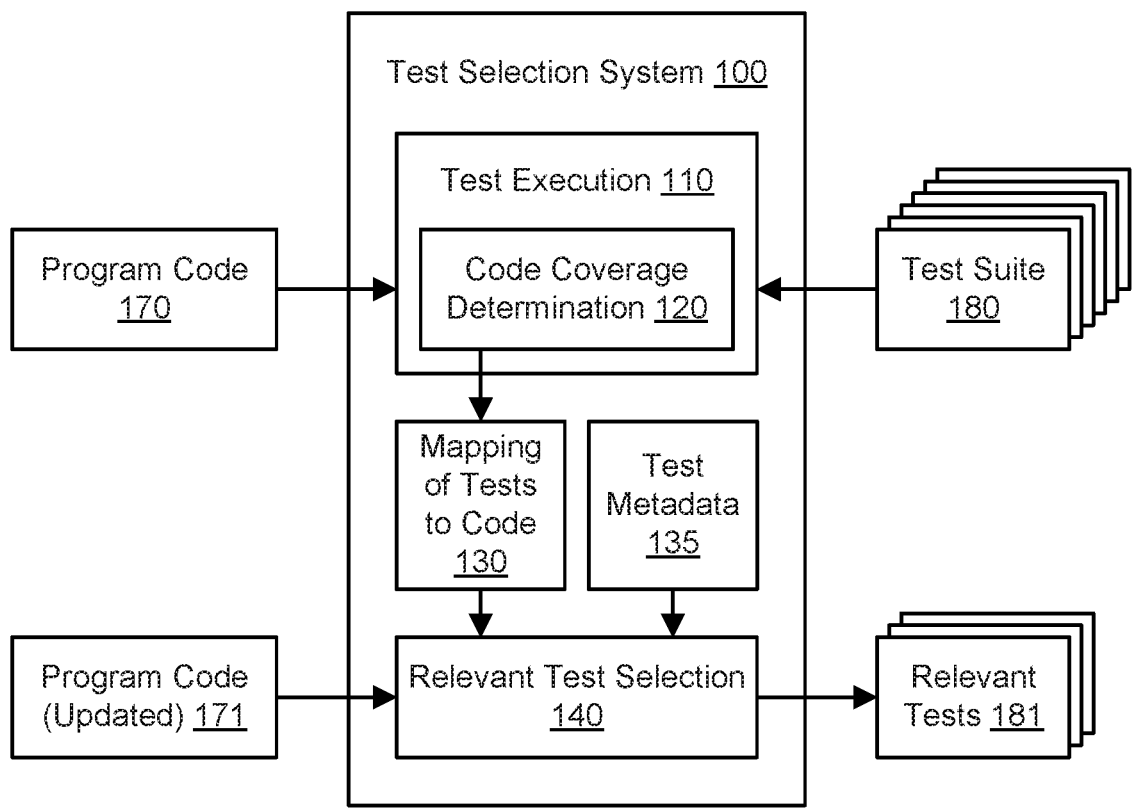
FIG. 1 illustrates an example system environment for ordered test execution based on test coverage, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for ordered test execution based on code coverage are described. Using the techniques described herein, tests may be automatically selected to run against program code based (at least in part) on the relevance of those tests to changes in the program code. In one embodiment, individual tests are run against the program code to determine which portions of the code (e.g., which source files and lines of code) are exercised by particular tests. The resulting code coverage data may be used to generate a mapping of individual tests to portions of program code. When a version of the program code with updated or new portions of code is sought to be tested, the portions that were changed or added (e.g., the source files and lines of code) may be determined, and the mapping may be used to determine which tests are relevant to (e.g., likely to be exercised by) these changed or new portions. A test selection system or service may produce an ordered sequence of tests that are likely to be exercised by the updated program code. In one embodiment, a confidence score may be determined for each test in a suite of tests, where the confidence score represents the likelihood that a test will exercise the updated or new portions of code, and tests whose confidences scores meet a predetermined confidence threshold may be included in the selection of tests while tests that fail to meet the confidence threshold may be excluded. In some embodiments, the order of the sequence may be determined based (at least in part) on factors such as the likelihood that a test will exercise the updated or new portions of code, the stability of a test (e.g., the likelihood that the test will detect a problem), the execution time of a test, and/or other factors that may contribute to a score for a test. A machine learning model may be used to score tests. In one embodiment, the number (N) of tests in the selection of tests may be determined based (at least in part) on user input, and the N tests having the highest scores may be ranked by their scores in the ordered sequence. The selected tests may be executed automatically, e.g., as part of a continuous integration system, continuous deployment system, or pipeline. By selecting and running only tests that are most relevant to changes or additions to program code, the techniques described herein may avoid taking the time and computational resources to run less relevant tests.

As one skilled in the art will appreciate in light of this disclosure, embodiments may be capable of achieving certain technical advantages, including some or all of the following: (1) faster or more efficient use of computers due to the reduction of tests to run in comparison to a full test suite, (2) reduced memory and storage requirements due to the smaller size of a selected test suite in comparison to a full test suite, (3) reduced network usage due to the smaller size of a selected test suite in comparison to a full test suite, (4) reduced developer time and computational resources in analyzing and determining the membership of a set of tests, (5) reduced developer time and computational resources in developing a test plan, (6) improved scalability for identifying and running tests, etc. Using prior approaches to testing software, an entire suite of tests would often be run for every new version of a software product. In some development environments, code changes may be committed several times a day, and each code commit may undergo testing. As more and more tests are added throughout the life of the software product, the time and computing resources required to run the full suite of tests may become prohibitively expensive. However, if a developer manually selects a subset of tests to run, then the developer may mistakenly include irrelevant tests or exclude relevant tests. To address these problems, the techniques described herein may reduce the number of tests to be run and also increase the effectiveness of the tests by automatically selecting the most relevant tests for a particular version of a software product.

FIG. 1 illustrates an example system environment for ordered test execution based on test coverage, according to one embodiment. The example system environment may comprise a test selection system 100. The test selection system 100 may include various modules, components, or functionalities such as a test execution module 110 and a relevant test selection module 140. The test selection system 100 may be used to test a software product at build time, deployment time, or any other suitable time in the development cycle. The test selection system 100 may be part of a testing framework that is available to developers of various types of software product. For example, software products to be tested using the test selection system 100 may include services that collaborate with other services according to a service-oriented architecture. The test selection system 100 may itself be implemented as a service whose functionality can be invoked by clients (including end users and/or other services) via a programmatic interface or user interface. In one embodiment, aspects of the test selection system 100 may be activated as part of a deployment pipeline for deploying a software product to a production environment. In one embodiment, aspects of the test selection system 100 may be part of or invoked by a continuous integration system or continuous deployment system.

In one embodiment, a suite of tests 180 may be determined based (at least in part) on user input. For example, a developer associated with program code 170 for a software product may supply or indicate tests that she or he deems to be relevant to the software product. However, some of the tests 180 may be relevant to portions of the software product that are not updated often, while others of the tests 180 may be relevant to portions of the software product that are more frequently updated, and yet others of the tests 180 may no longer be relevant to any portion of the software product due to maturation of the software product. Individual tests in the suite 180 may be configured with suitable parameters. In general, the test suite 180 may include performance tests such as sanity tests, latency tests, and/or load tests for scalability and throughput. Each test may be associated with an acceptable range of results, such that results outside the acceptable range may constitute a failure for that particular test. In one embodiment, various heuristics may be applied to determine whether the software product passes or fails a particular test. In one embodiment, the tests may include unit tests, e.g., tests in which the test host(s) do not access other systems over a network. In one embodiment, the tests may include integration tests, e.g., tests in which the test host(s) do access other systems over a network.

The test selection system 100 may select relevant tests 181 to be run with respect to program code 171. The relevant tests 181 may be selected from the full test suite 180, such that the full test suite 180 typically includes more tests than the selected set 181. By reducing the number of tests to be executed, the test selection system 100 may reduce the time and computing hardware needed to test a software product. By selecting the most relevant tests from the test suite 180, the test selection system 100 may improve the effectiveness of the testing process, e.g., by making the testing process more likely to find errors in the program code in a shorter period of time. Execution of the tests 181 may be initiated automatically or manually and performed in any suitable environment. In one embodiment, the test selection system 100 may initiate execution of the selected tests 181. In one embodiment, the execution of the selected tests 181 may be initiated in an environment separate from the test selection system 100, e.g., by a developer using the information generated by the test selection system. Tests may be performed by executing program code using computing resources such as the example computing device 3000 illustrated in FIG. 7.

Prior to selection of relevant tests 181, the test execution module 110 may implement, execute, or otherwise perform the individual tests in the test suite 180 for the program code 170 of the software product under test. The program code may represent instructions in a high-level programming language. The program code may represent a set of files, modules, and/or other elements relating to a software product. The tests in the test suite 180 may initially be submitted by one or more developers associated with the software product. As the software product matures, more and more tests may be added to the test suite 180, such that manual selection of relevant tests may be time-consuming and prone to error. The tests 180 may be executed on an individual basis, either serially or in parallel. The test execution module 110 may perform the tests 180 in any suitable order.

In one embodiment, the tests 180 may be executed on a single system such as a developer computer system or a suitable test host. In one embodiment, the tests may be executed on a set of computer systems such as a fleet of test hosts. In one embodiment, the tests may be executed in a test environment in which the software product may be insulated from real-time interaction with real-world clients, e.g., by processing only synthetic requests or prerecorded client requests that were previously captured in a production environment. For example, if the software product implements a service that is associated with an electronic commerce (e-commerce) merchant, then the service may be configured to perform one or more suitable operations such as generating a web page (e.g., a product description page for a product offered for sale by the merchant), completing a sale or other transaction between the merchant and a customer, verifying a payment presented by the customer, etc.

The program code 170 may be instrumented such that execution of the code during the test execution 110 generates code coverage data. As shown in FIG. 1, the test execution module 110 may implement code coverage determination 120. In various embodiments, any suitable code coverage product(s) may be used to implement the code coverage determination 120, including commercially available code coverage products. For a particular test, the code coverage data may indicate what portions of the code were exercised (e.g., encountered, executed, or otherwise performed) by the test. In one embodiment, the code coverage data may also indicate additional metrics, such as the percentage of code of a particular file or module that was exercised by a particular test. Based (at least in part) on the code coverage data, a mapping 130 of the tests to the program code may be generated. The mapping 130 may indicate what portions of the code 170 (if any) were exercised (e.g., encountered, executed, or otherwise performed) by each test in the suite of tests 180. The affected portions of the code may be indicated by line numbers within particular source files. In one embodiment, the mapping 130 may indicate which methods, classes, packages, and/or groups were exercised by each test. The mapping 130 may be stored in a data store for reference at a later time. The system 100 may also maintain other test-related metadata 135, such as a history of test execution runtimes, test successes and/or failures, user feedback regarding tests, and so on.

At some point in time, a developer of the software product may seek to modify or update the program code for the software product. The updated program code 171 may include additions, deletions, rollbacks, and/or other modifications with respect to the earlier version of the program code 170. The updated program code 171 may be associated with change data. The change data may represent data indicative of one or more modified or new portions of the updated version 171 of the program code. For example, the change data may indicate one or more line numbers within particular source files. In one embodiment, the change data may indicate which methods, classes, packages, and/or groups were modified or added relative to a previous version of the program code (e.g., the version that was tested using the full suite of tests). In one embodiment, the change data may be derived by the test selection system 100 using a comparison between the updated program code 171 and the earlier program code 170. In one embodiment, the change data may be generated in a development environment and received by the test selection system 100, e.g., along with the updated program code itself 171.

Using the relevant test selection module 140, a subset 181 of the tests may be selected from the full suite 180 of tests. In one embodiment, the selected subset 181 of tests are likely to be exercised (e.g., encountered, executed, or otherwise performed) by the updated program code 171. The subset 181 of the tests may be selected based (at least in part) on the mapping 130 and on the change data associated with the updated program code 171. In one embodiment, the locations of the changed portions of the updated program code 171 (e.g., line numbers in particular files) may be used with the mapping 130 to determine which tests have previously exercised those locations of the code. In one embodiment, the subset 181 of the tests may be selected and/or prioritized based (at least in part) on the test metadata 135. Test selection and test prioritization using test metadata 135 are discussed in greater detail with respect to FIG. 3A and FIG. 3B.

In one embodiment, one or more machine learning models may be used to determine which tests are likely to be exercised by the updated program code 171. For example, if the updated program code includes new line numbers and/or new files, then the similarity of those new elements to previous elements may be assessed using machine learning so that relevant tests 181 can be selected. In one embodiment, a confidence score may be determined for each test in a suite of tests, where the confidence score represents the likelihood that a test will exercise the updated or new portions of code, and tests whose confidences scores meet a predetermined confidence threshold may be included in the selection of tests while tests that fail to meet the confidence threshold may be excluded. In one embodiment, the number (N) of tests in the selection of tests may be determined based (at least in part) on user input, and the N tests having the highest confidence scores may be included in the selected subset. In one embodiment, a newly submitted test (e.g., a test submitted with the new version of the program code) may be added to the subset of the tests automatically to ensure that the new test is run at least once.

The relevant tests 181 may be executed for the updated program code in any suitable environment. In one embodiment, the relevant tests 181 may be initiated manually by a developer based on information generated by the test selection system 100. In one embodiment, the relevant tests 181 may be initiated automatically by the test selection system itself 100, by a node or stage in a deployment pipeline, by a component of a continuous integration system or continuous deployment system, and so on.

The test selection system 100 may store a test execution history for a plurality tests and software products, e.g., with the test metadata 135. The test selection system 100 may refer to the test execution history, e.g., in determining the relevancy and/or priority of tests. The test selection system 100 may present any suitable interface(s) to offer its functionality for test ordering to clients. Selected tests 181 may be executed in a test environment comprising computing resources such as the example computing device 3000 shown in FIG. 7. In one embodiment, a test ordering cache may act as an intermediary between the test execution environment and the test selection system 100. The relevant set of tests 181 or data indicating the relevance and/or priority of the tests may be stored in the test ordering cache. The test execution environment may then refer to the cached sequence when the test selection system 100 is not accessible to the test execution environment.

Figure 7:
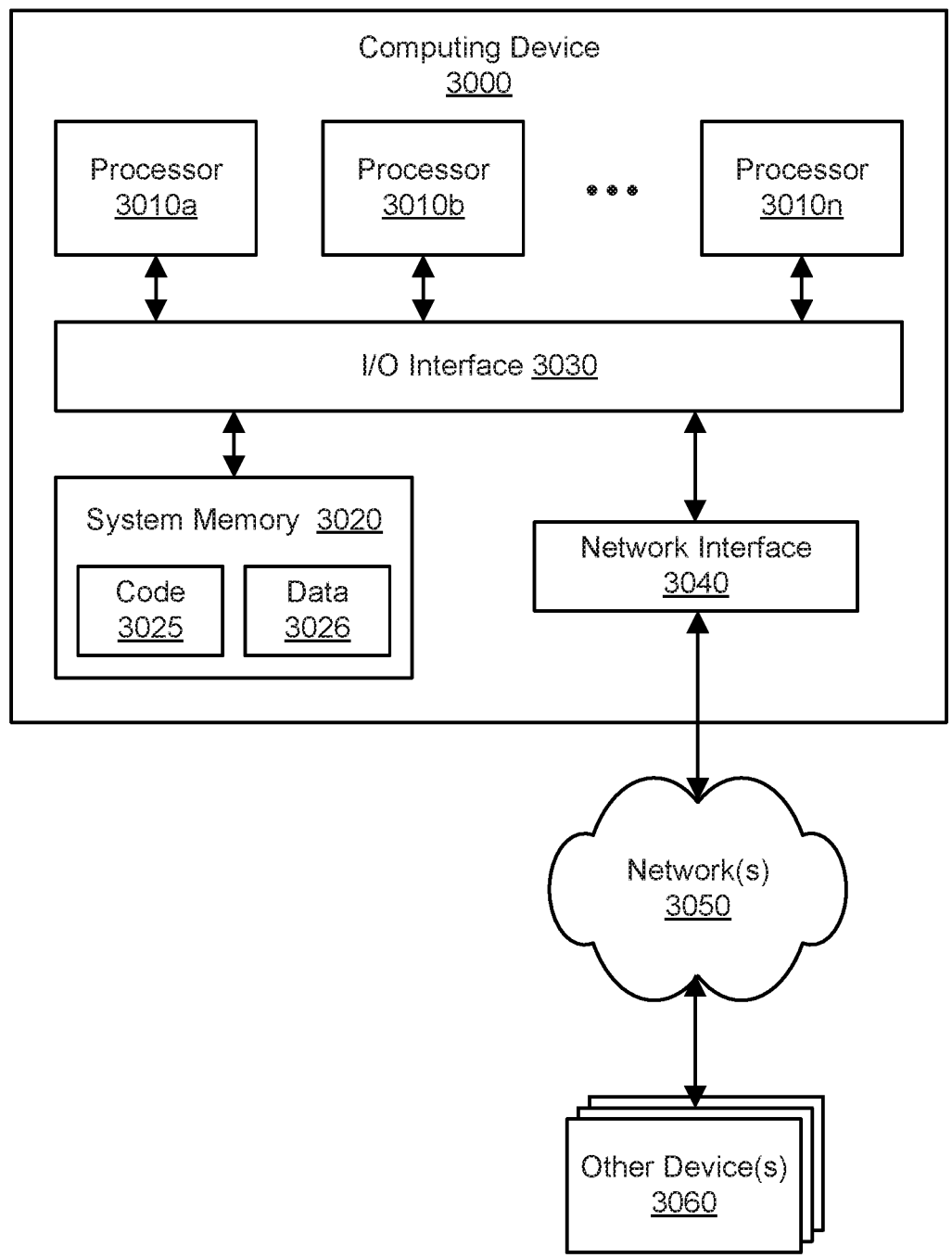
FIG. 7 illustrates an example computing device that may be used in some embodiments.

The test selection system 100 may comprise one or more computing devices, any of which may be implemented by the example computing device 3000 illustrated in FIG. 7. In various embodiments, the functionality of the different modules (e.g., test execution module 110 and relevant test selection module 140) may be provided by the same computing device or by different computing devices. If any of the test execution module 110 and/or relevant test selection module 140 are implemented using different computing devices, then the modules and their respective computing devices may be communicatively coupled, e.g., via a network. Each of the test execution module 110 and relevant test selection module 140 may represent any combination of software and hardware usable to perform their respective functions, as discussed as follows. Operations implemented by the test execution module 110 and relevant test selection module 140 may be performed automatically, e.g., without a need for user initiation or user intervention after an initial configuration stage, and programmatically, e.g., by execution of program instructions on a computing device. In one embodiment, the test selection system 100 may be implemented using resources of a multi-tenant provider network in which different services and systems collaborate to offer computing resources, storage resources, and other types of resources to clients.

Figure 2:
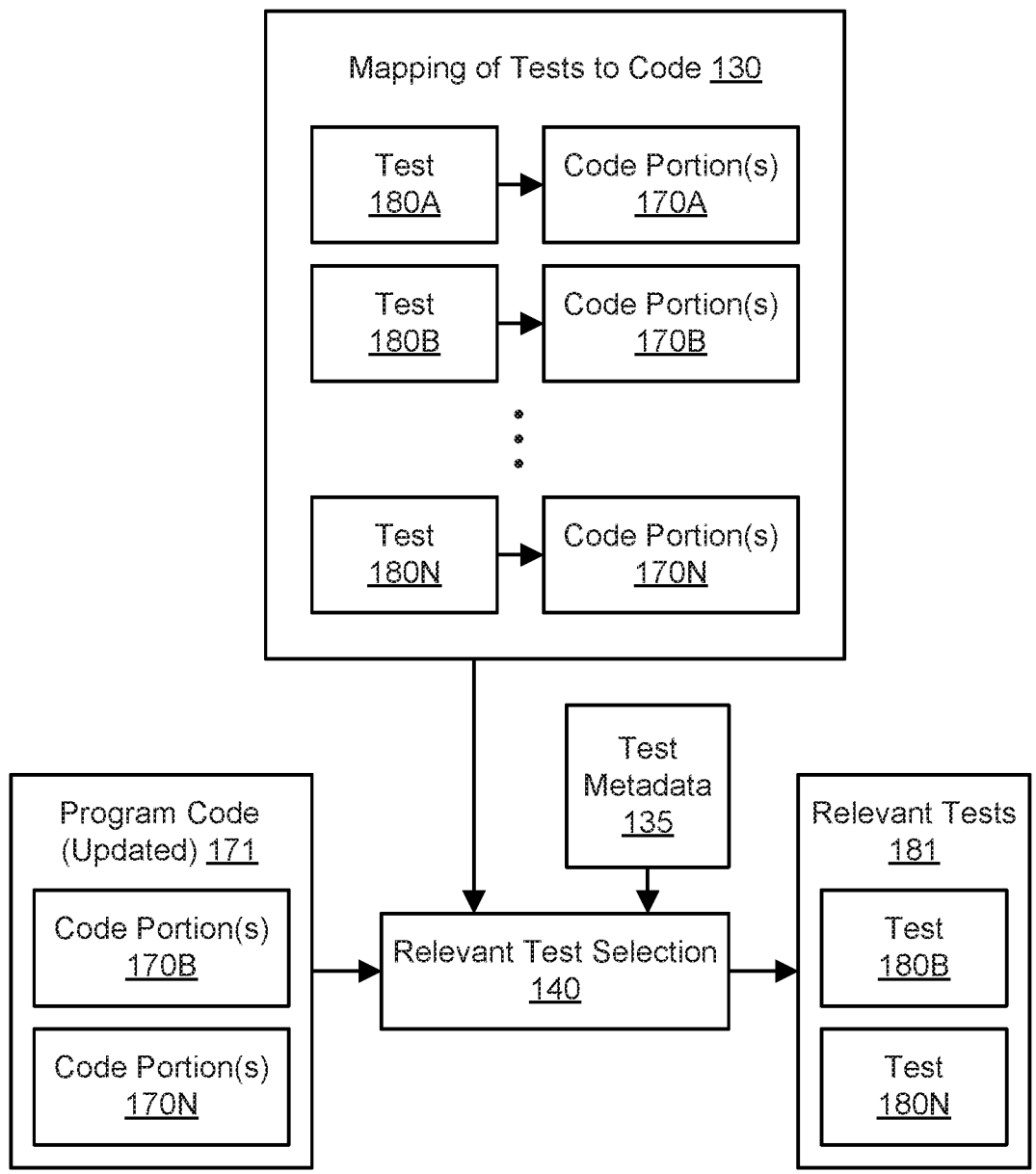
FIG. 2 illustrates further aspects of the example system environment for ordered test execution based on test coverage, including an example of relevant test selection, according to one embodiment.

FIG. 2 illustrates further aspects of the example system environment for ordered test execution based on test coverage, including an example of relevant test selection, according to one embodiment. The mapping 130 generated by the test execution 110 may indicate all of the tests that were performed for a particular software product. As shown in the example of FIG. 2, the mapping 130 may indicate tests 180A and 180B through 180N. For each of the indicated tests 180A-180N, the mapping 130 may indicate which portions of the tested program code (if any) were exercised (e.g., encountered, executed, or otherwise performed) by the test. As shown in the example of FIG. 2, the mapping 130 may indicate that test 180A exercised one or more portions 170A of the program code 170, test 180B exercised one or more portions 170B of the program code 170, test 180N exercised one or more portions 170N of the program code 170, and so on. The various portions 170A-170N may be distinct or may overlap. In the mapping 130, the portions 170A-170N of the code may be indicated by line numbers within particular source files. In one embodiment, the portions 170A-170N may indicate which methods, classes, packages, and/or groups were exercised by each test.

At some point in time, a developer of the software product may seek to modify or update the program code for the software product. The updated program code 171 may include additions, deletions, rollbacks, and/or other modifications with respect to the earlier version of the program code 170. As shown in the example of FIG. 2, the modified portions of the updated program code 171 may include portion(s) 170B and portion(s) 170N but not portion(s) 170A. In one embodiment, the changes to portion(s) 170B and 170N may be determined based (at least in part) on change data associated with the updated code 171. For example, the change data may indicate one or more line numbers within particular source files. In one embodiment, the change data may indicate which methods, classes, packages, and/or groups were modified relative to a previous version of the program code (e.g., the version that was tested using the full suite of tests).

Using the relevant test selection module 140, a subset 181 of the tests that are relevant to the updated program code 171 may be selected from the full suite 180 of tests. The selected subset 181 of tests are likely to be exercised (e.g., encountered, executed, or otherwise performed) by the updated program code 171. The subset 181 of the tests may be selected based (at least in part) on the mapping 130 and on the change data associated with the updated program code 171. As shown in the example of FIG. 2, the test selection 140 may determine that code portion(s) 170B and 170N have been changed, perform a reverse lookup of those portions in the mapping 130, and determine that tests 180B and 180N are relevant to the modified portion(s) in the mapping. The test selection 140 may then generate a list or set of relevant tests 181 including tests 180B and 180N. In one embodiment, the number of tests and/or the membership of tests in the set 181 may be determined based (at least in part) on user input and/or other factors, including the test metadata 135. For example, if a developer seeks to have only one test, then either test 180B or test 180N may be selected for the set 181 based on a relative priority of the tests. As another example, if a developer seeks to have the ten most relevant tests in the set 181, then up to eight tests other than test 180B and test 180N may be added. The updated code 171 may be tested using the relevant tests 181. By limiting the membership of the selected tests 181 in this manner, the test selection system 100 may prevent the execution of a test 180A that is unaffected by changes to the program code and therefore unlikely to yield additional information in comparison to testing of previous versions of the program code.

Figure 3A:
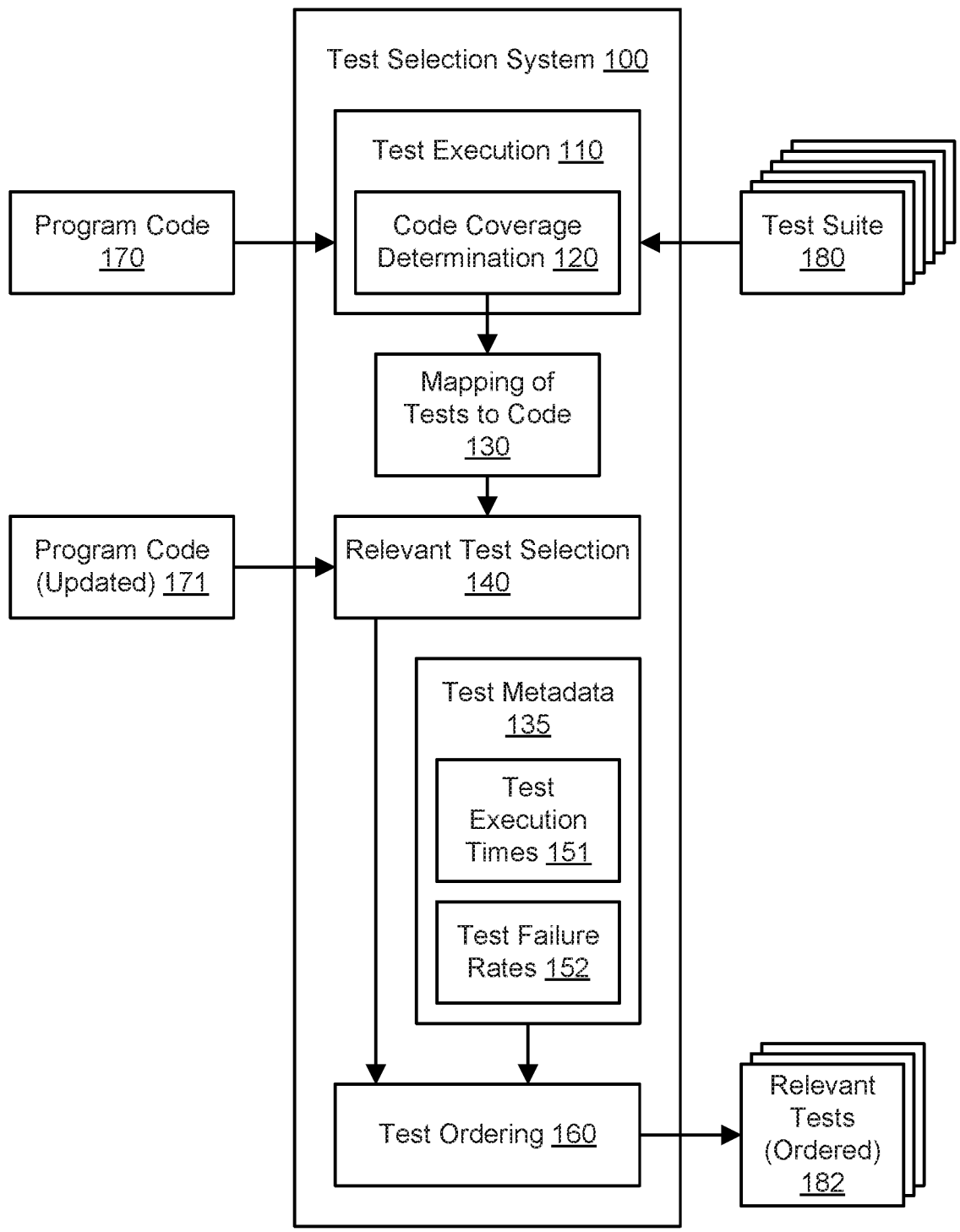
FIG. 3A and FIG. 3B illustrate further aspects of the example system environment for ordered test execution based on test coverage, including prioritizing tests based on test execution times and test failure rates, according to one embodiment.
Figure 3B:
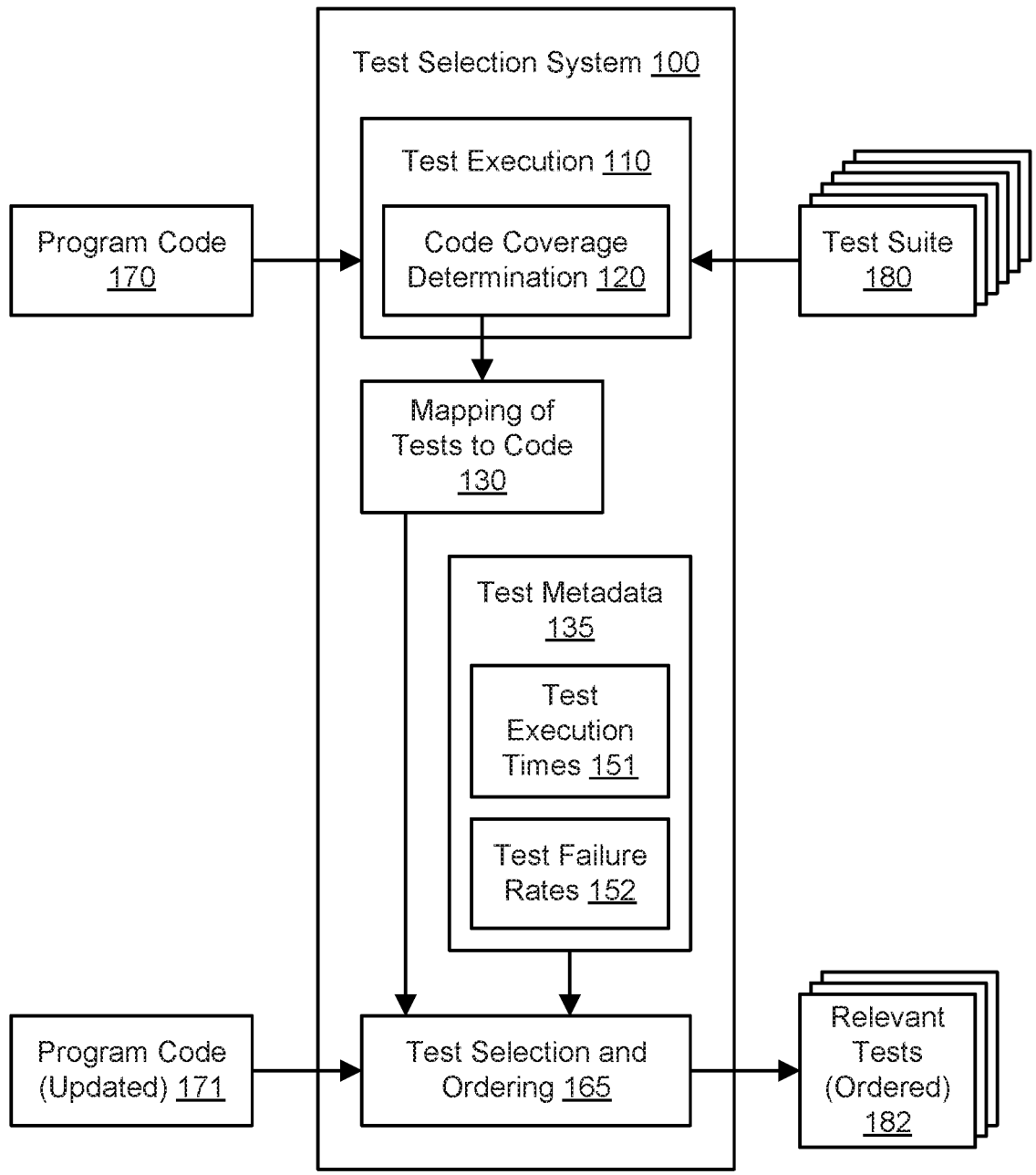

FIG. 3A and FIG. 3B illustrate further aspects of the example system environment for ordered test execution based on test coverage, including prioritizing tests based on test execution times and test failure rates, according to one embodiment. In one embodiment, using a test ordering module 160, the selected subset of tests 181 may be placed in an ordered sequence to produce an ordered subset of relevant tests 182, where a test earlier in the sequence will be executed before a test later in the sequence. The order or priority of the tests may be determined by scoring individual tests based on one or more factors. In one embodiment, the number (N) of tests in the selection of tests may be determined based (at least in part) on user input, and up to N tests having the highest scores may be ranked by their scores in the ordered sequence 182. In one embodiment, as shown in FIG. 3A, the relevant tests 181 may be selected first by a test selection module 140, and then the relevant tests may be prioritized or otherwise ordered based on various factors by a test ordering module 160. In one embodiment, as shown in FIG. 3B, the selection and prioritization of tests may instead be performed by a test selection and ordering module 165.

In one embodiment, the full test suite 180 may be scored according to various factors, including the likelihood of a test being exercised along with other factors, to produce the ordered set of relevant tests 182. Various factors may be weighted to derive a composite score for each test. In one embodiment, the factor(s) may include confidence scores that indicate whether tests are likely to be exercised by the modified portions of the updated program code. All other factors being equal, tests with higher confidence scores may be ranked higher than tests with lower confidence scores in the ordered test sequence 182. In one embodiment, tests with confidence scores that meet (or exceed) a confidence threshold may be considered for inclusion in the ordered relevant test set 182, while tests that do not meet the confidence threshold may not be considered for inclusion.

In various embodiments, factors other than the likelihood of a test being exercised may be included in the scoring of tests to determine their relative priority. In one embodiment, the factor(s) may include estimated execution times 151 for tests. The execution times 151 may be estimated based (at least in part) on historical test execution data. All other factors being equal, tests with shorter execution times may be ranked higher than tests with longer execution times in the ordered test sequence 182. In one embodiment, the factor(s) may include stability or failure rates 152 for tests (e.g., the likelihood that a test will detect a problem in program code). The failure rates 152 may be determined based (at least in part) on historical test execution. All other factors being equal, tests with higher failure rates may be ranked higher than tests with lower failure rates in the ordered test sequence 182, and the entire testing process may be terminated early if a test fails so that time and computing resources may be used efficiently. In one embodiment, the factor(s) may include user input related to historical test selection, e.g., whether or not users tend to approve system-generated recommendations to use a particular test, or whether or not users tend to manually add non-recommended tests. For example, if developers often add a test that was not recommended by the system 100, then the system may use that feedback to give that test a higher score or higher priority in future selections. In one embodiment, a newly added test may be given a higher weight to increase its chances of being included in the ordered relevant tests 182. In one embodiment, tests may be manually included in or excluded from the tests 182, based (at least in part) on user input, by assigning weights to coefficients of the expression used to score tests. In one embodiment, essential tests such as sanity tests may be automatically included and given a high priority in every suite of relevant tests 182 for a particular software product. The essential nature of such tests may be determined based (at least in part) on a high frequency of automatic selection of the tests by the system 100 and/or on user input. In one embodiment, one or more machine learning models may be used to score the relative priority of tests.

In one embodiment, the test ordering module 160 may generate the ordered sequence 182 such that tests that are more likely to be exercised are located earlier in the sequence than tests that are less likely to be exercised, such that tests that are more likely to fail are located earlier in the sequence than tests that are less likely to fail, and such that tests that are more likely to be completed quickly are located earlier in the sequence than tests that are less likely to be completed quickly. The test ordering module 160 may assess each test in the set of relevant tests by scoring each test based on a series of factors. Each of the factors may represent a heuristic that assesses where the test should be placed in the ordered sequence. The weights may vary from factor to factor and from test suite to test suite. To score each of the tests, the test ordering 160 may use a plurality of test scoring plugins. Each of the plugins may represent one of the weighted factors and may comprise any suitable set of program instructions and data to calculate the corresponding factor.

In one embodiment, the test scoring plugins may include a test age plugin that scores a test according to its age, e.g., the relative newness of the test. Newer tests may be considered more likely to fail than older tests. In one embodiment, the test scoring plugins may include a test failure rate plugin that scores a test according to its failure rate, e.g., the failures in its portion of the test execution history. The test failure rate may be determined based on the age of the failure such that newer failures have a greater contribution than older failures. The test failure rate may be determined based on a raw number of failures and/or on a percentage of failures over a period of time. In one embodiment, the test failure rate may be determined based on a success/failure correlation with other tests.

In one embodiment, the test scoring plugins may include a test duration plugin that scores a test according to its estimated time to completion. Based on the test duration factor, shorter tests may be placed earlier in the ordered sequence than longer tests in order to enable faster feedback on potential failures. In one embodiment, the test scoring plugins may include a source code modification plugin that scores a test according to the age of any modification to its source code. More recently modified tests may be considered more likely to fail than less recently modified tests. In one embodiment, the source code modification plugin may score a test according to the age of any modification to the source code of the software product under test. Again, more recently modified code may be considered more likely to fail than less recently modified code. Additionally, the test scoring plugins may include one or more custom scoring plugins for additional adjustment of the scores.

In one embodiment, test execution results may be analyzed by a test scoring modification module. Based on the success or failure of various sets of ordered tests and the correctness (or lack thereof) of the estimated relevancy and estimated likelihood of failure, the test scoring modification module may modify the weights of one or more of the factors implemented by the test ordering 160. For example, if later tests tend to fail more than earlier tests, the test scoring modification module may use machine learning techniques to detect the most relevant factors in anticipating failure and modify the weights assigned to the various factors accordingly. Accordingly, the test scoring modification module may represent part of a feedback loop to continually optimize the manner in which tests are ordered.

The test execution may implement a functionality for success/failure assessment. Using the functionality for success/failure assessment, the test execution module may determine whether the service or program passes or fails a particular test. Various performance metrics may be collected in conjunction with the tests to determine the impact of the tests and thus to assess the success or failure of a particular test. For example, the performance metrics may relate to aspects of processor usage, memory usage, disk or storage usage, network usage, and/or the usage of any other measurable resource. The performance metrics may be collected using any suitable techniques, e.g., the instrumentation of various software modules and/or the use of data gathered by an operating system. The performance metrics may be used by various heuristics to determine whether the build passes or fails a particular test. In one embodiment, the heuristics may be predetermined or preconfigured by the developer or development team. The heuristics may also include default heuristics, where appropriate. In one embodiment, a user may specify the percentile metrics to consider for the heuristics (e.g., minimum, maximum, average, p50, p90, p99, etc.). In one embodiment, a user may specify which transactions to consider for the heuristics: e.g., all transactions averaged, any transaction type (e.g., fail if the p90 of any transaction type has increased by 10%), or a specific transaction type (e.g., fail if the p90 of reads has increased). In one embodiment, the heuristics may implement service level agreements (SLAs) for the software product. For example, the performance metrics collected for the tests may indicate the number of transactions processed and the pass/fail ratio. A heuristic may fail the build if the error rate exceeds a predetermined threshold (e.g., 0.1% error rate). Such a heuristic may be applied to one or more specific transaction types or to all transaction types. In one embodiment, the success/failure assessment may be provided back to the test selection system 100 as feedback to influence the selection of future tests, e.g., based on one or more machine learning models.

The test execution may implement a functionality for test suite termination. Using the functionality for test suite termination, the test execution may terminate further testing for the entire test suite when particular conditions are met. When testing is terminated at a particular point in the ordered sequence, any remaining tests in the ordered sequence may not be performed. The particular conditions under which testing may be terminated may be configurable. In one embodiment, the test suite may be terminated when a single test failure is encountered. In one embodiment, the test suite may be terminated when a particular number of test failures are encountered. In one embodiment, the test suite may be terminated when a particular number or percentage of test failures are encountered, e.g., within a particular period of time. In one embodiment, the test suite may be terminated when one or more particular types of test failures are encountered. In one embodiment, the test suite may be terminated based on dependencies between one or more failed tests and one or more current or upcoming tests; the dependencies may be determined using any suitable techniques, including machine learning techniques. In one embodiment, the test suite may be automatically terminated when the conditions are met. In one embodiment, a user may be notified of one or more test failures and/or if the particular conditions are met, and the test suite may be terminated based on user input following the notification. Because the tests may be ordered based (at least in part) on decreasing likelihood of failure, the testing process may be configured to end sooner rather than later if failures are encountered. In this manner, the development cycle may be optimized such that less developer time is spent waiting for a test suite to be completed.

The test execution may implement a functionality for failure notification. Using the functionality for failure notification, the test execution may notify a user or other module when one or more failures are encountered during the execution of a test suite. In one embodiment, the functionality for failure notification may be configured to notify the user or other module only when particular conditions are met, such as the conditions discussed above with respect to the functionality for test suite termination. As also discussed above, the test suite may be terminated based on user input following the notification.

The test execution may generate test execution results in connection with executing sets of tests. For each test that was attempted, the test execution results may indicate the success or failure of the test, the time at which the test was attempted, an identifier of the test, an identifier of the software product under test, an identifier of the testing environment, an identifier of the computing device(s) used in the test, and/or any other suitable metadata. The test execution results may be stored in a local test execution history, e.g., using a test ordering cache and/or test selection system 100. The test execution results for a particular version of a software product may be provided to the test selection system 100 for aggregation with a global test execution history. Because the test selection system 100 may use a global test execution history that includes test results from many systems, the test selection system 100 may generate an ordered sequence of relevant tests that is even further optimized.

Figure 4:
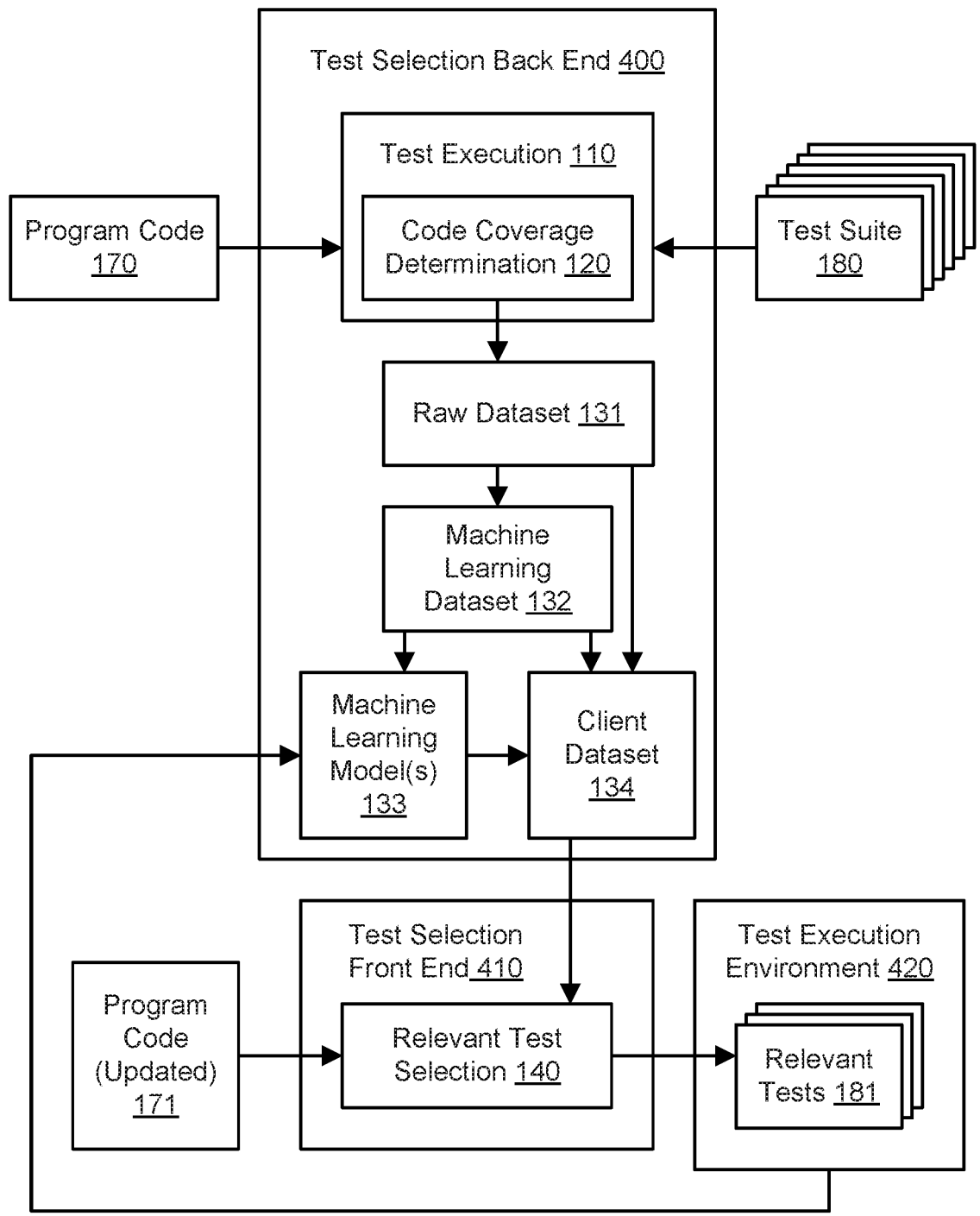
FIG. 4 illustrates further aspects of the example system environment for ordered test execution based on test coverage, including using machine learning models for test selection, according to one embodiment.

FIG. 4 illustrates further aspects of the example system environment for ordered test execution based on test coverage, including using machine learning models for test selection, according to one embodiment. In one embodiment, various components of the test selection system (or service) 100 may be partitioned into a test selection back end 400 and a test selection front end 410. The front end 410 may include components with which a client of the system 100 may interact, such as the relevant test selection module 140. The components in the back end 400 may not be known to users. In one embodiment, the back end 400 may include one or more machine learning models that determine which tests are likely to be exercised by the updated program code 171 and potentially the relative priority of the various tests. In one embodiment, if the updated program code includes new line numbers and/or new files, then the similarity of those new elements to previous elements may be assessed using machine learning so that relevant tests 181 can be selected. For example, if the new lines of code are in the same class as lines of code that are relevant to a particular test, then the machine learning model(s) 133 may determine that the particular test is likely to exercise the new lines of code as well.

In one embodiment, the code coverage data resulting from the test execution 110 may be used to generate a raw dataset 131. The raw dataset 131 may be uncompressed data that includes element information, test failure data, test runtime data, and data about the portions of program code that were exercised by each test. For example, the raw dataset 131 may indicate which methods, classes, packages, and/or groups were exercised by each test. The raw dataset 131 may be restructured into a machine learning dataset 132. The machine learning dataset 132 may be more suitable for use in training one or more machine learning models 133. In one embodiment, the machine learning dataset 132 may be significantly smaller in file size than the raw dataset 131, e.g., using techniques to compress the data and eliminate redundancies. In one example, the restructuring of the raw dataset into the machine learning dataset reduced the file size from 1 GB to 115 MB. The machine learning dataset 132 may include a two-dimensional (2D) array for each test. Each vector in the 2D array may represent method coverage, group coverage, class coverage, and a test method mapping rate. The method coverage may represent the value that is predicted, and the test method mapping rate may represent a percentage of methods that are exercised by a test.

Using logistic regression, the machine learning model(s) 133 may be trained using the machine learning dataset 132. The machine learning model(s) 133 may be updated periodically because the runtime, failure rates, and relevancy of various tests may change over time. In one embodiment, the machine learning model(s) 133 may relate to test-specific scores at various tiers of program code, such as methods, classes, packages, and/or groups. Based on logistic regression and feedback from both automated testing and users, the accuracy of test-specific scores may improve over time.

A client dataset 134 may be generated based (at least in part) on model data output by the machine learning model(s) 133, element data provided by the machine learning dataset 132, and test runtime data and test failure data derived from the raw dataset 131. The client dataset may be analogous to the mapping 130 shown in FIG. 1. The client dataset may include priority scores and/or confidence scores for various tests 180 as developed by the machine learning model(s) 133. The client dataset may include a model dataset for the data that defines the machine learning model(s) for each test, including coefficients, intercepts, and classes; a record dataset that maps data from an element of program code to a machine learning code coverage record; a test detail dataset that indicates the runtime and failure data for each test; and a test method mapping dataset that indicates the mapping data if a method is exercised by a test. The client dataset may again be reduced in size from the full machine learning dataset, thereby reducing storage requirements in storing the data and network latency in transmitting the data. The client dataset 134 may be stored in any suitable location, e.g., using a cloud-based storage service that is accessible to both the back end 400 and front end 410. The client dataset 134 may be downloaded to the test selection component 140 in the front end 410, where a set of relevant (and potentially ordered) tests 181 may be selected and ranked based (at least in part) on the change data for updated code 171 and on the client dataset 134. In one embodiment, the selected tests 181 may be executed in a test execution environment 420 using one or more computing devices such as the example computing device 3000 shown in FIG. 7. Feedback from the test execution environment 420 may be used to update the machine learning model(s) 133. For example, the machine learning model(s) 133 may be updated as test failure rates and test execution times change over time.

Figure 5:
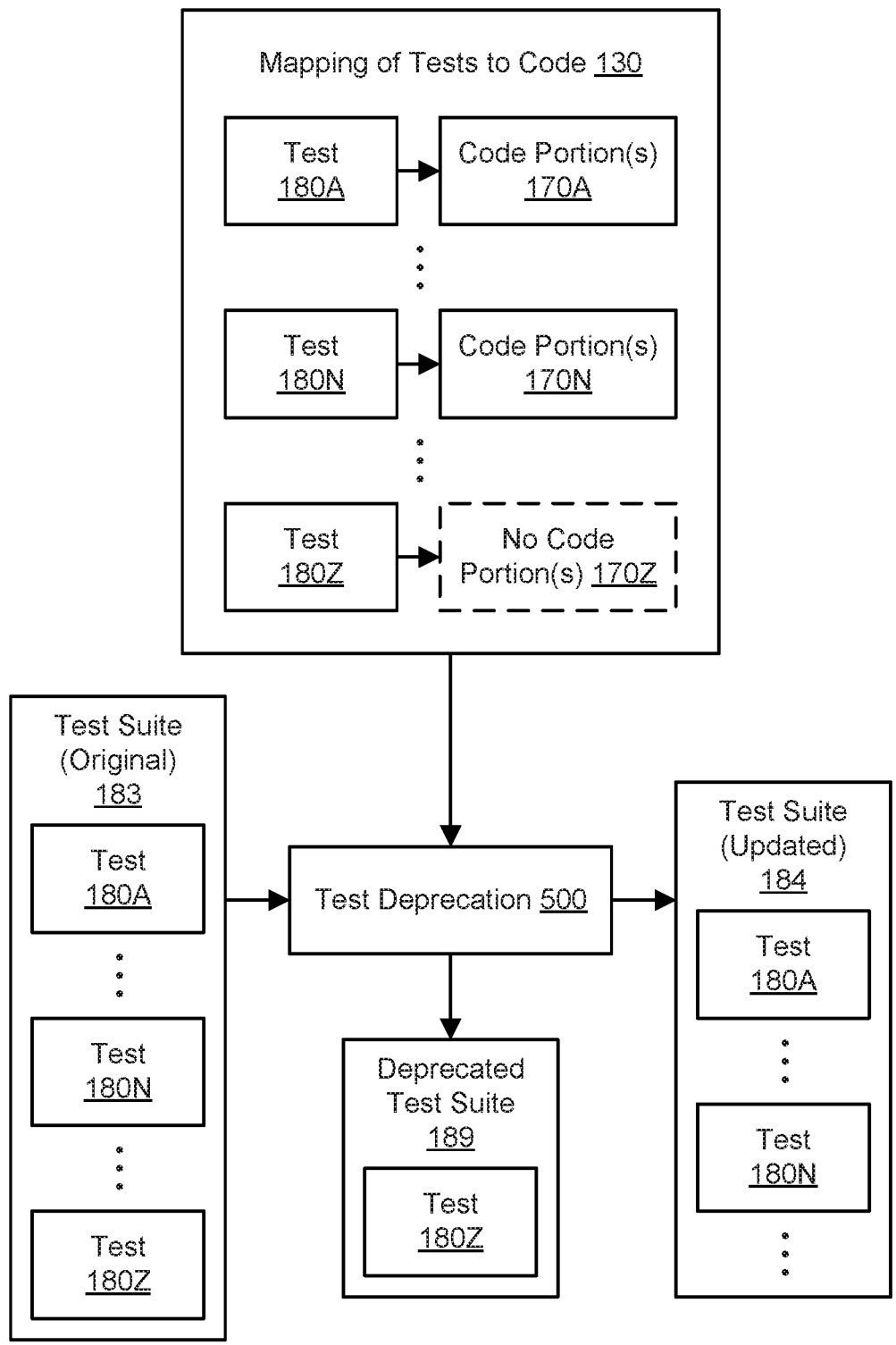
FIG. 5 illustrates further aspects of the example system environment for ordered test execution based on test coverage, including removing tests that are no longer relevant to program code, according to one embodiment.

FIG. 5 illustrates further aspects of the example system environment for ordered test execution based on test coverage, including removing tests that are no longer relevant to program code, according to one embodiment. As a software product matures, more and more tests may be added to the test suite associated with that software product. Over time, some tests may become outdated in that they are no longer exercised by any portion of the program code for that software product. A test deprecation component 500 may be used to identify and remedy these outdated and/or irrelevant tests. The test deprecation component 500 may be implemented as part of the test selection system 100. In one embodiment, the code coverage determination 120 may find that a particular test 180Z, when run against the program code 170, exercises no portions of that program code. The observation that the test 180Z exercises no code portions may be indicated by element 170Z in the mapping. In various embodiments, the test deprecation component 500 may run automatically and periodically, e.g., once per day or once per week, or whenever a code commit is submitted to the test selection system 100. Using the mapping 130, the test deprecation component 500 may determine that test 180Z is irrelevant to the software product in its current version. The test deprecation component 500 may then move the irrelevant test 180Z from the original test suite 183 into a deprecated test suite 189. An updated version 184 of the test suite, now without the test 180Z, may also result from the move. The tests in the deprecated test suite 189 may not be considered for inclusion in future selections of tests for particular versions or updates of the software product. In one embodiment, tests that have consistently low scores for relevance may also be moved to the deprecated test suite 189. In one embodiment, a deprecated test may be moved back to the full test suite if the portion of program code that was previously exercised by the deprecated test is restored to the program code. Using automatic test deprecation 500, the computing performance of the test selection system 100 may be improved by reducing the number of tests that the system analyzes, reducing the amount of memory used to store information about tests, and so on.

Figure 6A:
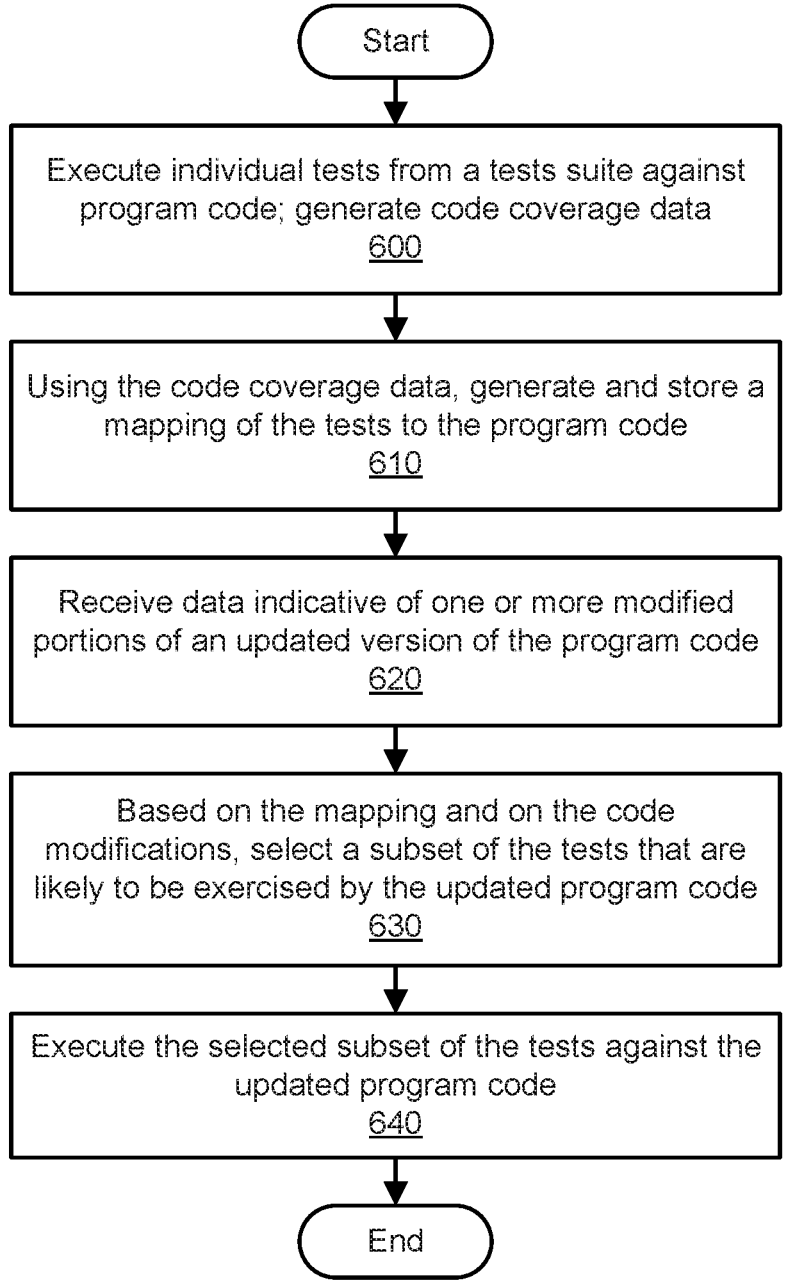
FIG. 6A is a flowchart illustrating a method for test execution based on test coverage, according to one embodiment.

FIG. 6A is a flowchart illustrating a method for test execution based on test coverage, according to one embodiment. As shown in 600, tests from a test suite may be executed against (or for) a set of program code. The program code may represent instructions in a high-level programming language. The program code may represent a set of files, modules, and/or other elements relating to a software product. The tests in the test suite may initially be submitted by one or more developers associated with the software product. As the software product matures, more and more tests may be added to the test suite, such that manual selection of relevant tests may be time-consuming and prone to error. The tests may be executed on an individual basis, either serially or in parallel. The program code may be instrumented such that execution of the code during the testing process generates code coverage data. In various embodiments, any suitable code coverage products may be used, including commercially available code coverage products. For a particular test, the code coverage data may indicate what portions of the code were exercised (e.g., encountered, executed, or otherwise performed) by the test. In one embodiment, the code coverage data may also indicate additional metrics, such as the percentage of code of a particular file or module that was exercised by a particular test.

As shown in 610, based (at least in part) on the code coverage data, a mapping of the tests to the program code may be generated. The mapping may indicate what portions of the code (if any) were exercised (e.g., encountered, executed, or otherwise performed) by each test in the suite of tests. The affected portions of the code may be indicated by line numbers within particular source files. In one embodiment, the mapping may indicate which methods, classes, packages, and/or groups were exercised by each test. The mapping may be stored in a data store for reference at a later time.

As shown in 620, change data associated with updated program code may be received or generated. The updated program code may represent a new version of the program code with include additions, deletions, and/or modifications with respect to the earlier version of the program code tested in 600. The change data may represent data indicative of one or more modified or new portions of an updated version of the program code. For example, the change data may indicate one or more line numbers within particular source files. In one embodiment, the change data may indicate which methods, classes, packages, and/or groups were modified or added relative to a previous version of the program code (e.g., the version that was tested using the full suite of tests). In one embodiment, the change data may be derived by a comparison between the updated program code and the earlier program code. In one embodiment, the change data may be generated in a development environment and received along with the updated program code, e.g., by a test selection system or service.

As shown in 630, a subset of the tests may be selected from the full suite of tests, where the subset of tests are likely to be exercised (e.g., encountered, executed, or otherwise performed) by the updated program code. The subset of the tests may be selected based (at least in part) on the mapping of tests to portions of the program code and on the change data associated with the updated program code. In one embodiment, the locations of the changed portions of the updated program code (e.g., line numbers in particular files) may be used with the mapping to determine which tests have previously exercised those locations of the code. In one embodiment, one or more machine learning models may be used to determine which tests are likely to be exercised by the updated program code. For example, if the updated program code includes new line numbers and/or new files, then the similarity of those new elements to previous elements may be assessed using machine learning so that relevant tests can be selected. In one embodiment, a confidence score may be determined for each test in a suite of tests, where the confidence score represents the likelihood that a test will exercise the updated portions of code, and tests whose confidences scores meet a predetermined confidence threshold may be included in the selection of tests while tests that fail to meet the confidence threshold may be excluded. In one embodiment, the number (N) of tests in the selection of tests may be determined based (at least in part) on user input, and up to N tests having the highest confidence scores may be included in the selected subset. In one embodiment, a newly submitted test (e.g., a test submitted with the new version of the program code) may be added to the subset of the tests to ensure that the new test is run at least once.

As shown in 640, the selected subset of the tests may be executed against the updated program code. Feedback from the test execution in 640 may be used to influence the selection of tests in the future. In some embodiments, the operations shown in 600, 610, 620, 630, and/or 640 may be performed by a test selection system or test selection service. In some embodiments, the operations shown in 600, 610, 620, 630, and/or 640 may be invoked by a continuous integration system, a continuous deployment system, or one or more stages of a pipeline. One or more of the operations, such as the mapping shown in 610 and the test selection shown in 630, may be performed automatically (e.g., without necessarily requiring user input) and programmatically (e.g., by execution of program instructions on a computing device). By performing an automatic selection of relevant tests as shown in FIG. 6A, a test selection system or service may reduce the time to perform tests, reduce the number of computing resources used to perform tests, and improve the effectiveness of the tests.

Figure 6B:
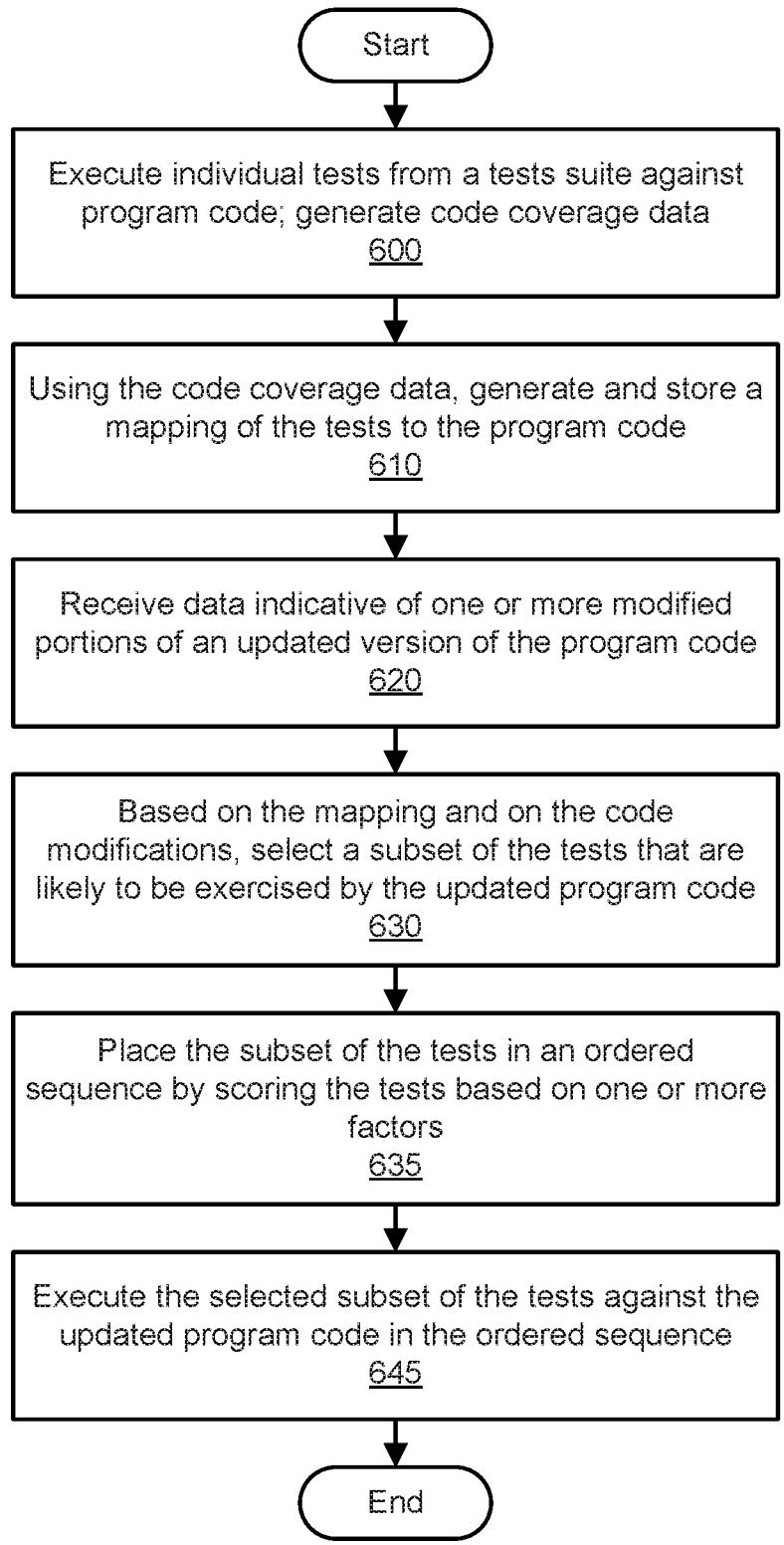
FIG. 6B is a flowchart illustrating a method for ordered test execution based on test coverage, according to one embodiment.

FIG. 6B is a flowchart illustrating a method for ordered test execution based on test coverage, according to one embodiment. As shown in 600, tests from a test suite may be executed against (or for) a set of program code. As shown in 610, based (at least in part) on the code coverage data, a mapping of the tests to the program code may be generated. As shown in 620, change data associated with updated program code may be received or generated. As shown in 630, a subset of the tests may be selected from the full suite of tests, where the subset of tests are likely to be exercised (e.g., encountered, executed, or otherwise performed) by the updated program code.

As shown in 635, the selected subset of tests may be placed in an ordered sequence. The order or priority of the tests may be determined by scoring each test based on one or more factors. The factors may be weighted to derive a composite score. In one embodiment, the factor(s) may include confidence scores that indicate whether tests are likely to be exercised by the modified portions of the updated program code. All other factors being equal, tests with higher confidence scores may be ranked higher than tests with lower confidence scores. In one embodiment, the factor(s) may include estimated execution times for tests. The execution times may be estimated based (at least in part) on historical test execution. All other factors being equal, tests with shorter execution times may be ranked higher than tests with longer execution times. In one embodiment, the factor(s) may include stability or failure rates for tests (e.g., the likelihood that a test will detect a problem in program code). The failure rates may be determined based (at least in part) on historical test execution. All other factors being equal, tests with higher failure rates may be ranked higher than tests with lower failure rates, and the entire testing process may be terminated early if a test fails so that time and computing resources may be used efficiently. In one embodiment, the factor(s) may include user input for historical test selection, e.g., whether or not users tend to approve system-generated recommendations to use a particular test. In one embodiment, one or more machine learning models may be used to score the relative priority of tests. In one embodiment, the number (N) of tests in the selection of tests may be determined based (at least in part) on user input, and up to N tests having the highest scores may be ranked by their scores in the ordered sequence.

As shown in 645, the selected subset of the tests may be executed against the updated program code. Feedback from the test execution in 640 may be used to influence the selection of tests in the future, e.g., as test failure rates and test execution runtimes change. In some embodiments, the operations shown in 600, 610, 620, 630, 635, and/or 645 may be performed by a test selection system or test selection service. In some embodiments, the operations shown in 600, 610, 620, 630, 635, and/or 645 may be invoked by a continuous integration system, a continuous deployment system, or one or more stages of a pipeline. One or more of the operations, such as the mapping shown in 610 and the test selection shown in 630, may be performed automatically (e.g., without necessarily requiring user input) and programmatically (e.g., by execution of program instructions on a computing device). By performing an automatic selection and ordering of relevant tests as shown in FIG. 6B, a test selection system or service may reduce the time to perform tests, reduce the number of computing resources used to perform tests, and improve the effectiveness of the tests.

Illustrative Computer System

In at least some embodiments, a computer system that implements a portion or all of one or more of the technologies described herein may include a general-purpose computer system that includes or is configured to access one or more computer-readable media. FIG. 7 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more computing devices configured to implement a test selection system, wherein the test selection system is configured to:
execute a suite of tests on a first set of program code, wherein execution of a respective test from the suite generates data indicative of code coverage of the respective test with respect to the first set of program code;
store a mapping of the tests to the first set of program code, wherein the mapping is determined based at least in part on the data indicative of code coverage, and wherein the mapping comprises data indicative of one or more portions of the first set of program code exercised by respective tests from the suite;
receive a second set of program code, wherein the second set of program code is associated with data indicative of one or more modified or new portions of the second set of program code;
select a subset of the tests that are likely to exercise the second set of program code based at least in part on:
the mapping,
the data indicative of the one or more modified or new portions of the second set of program code, and
a determination of similarity of the one or more modified or the new portions to one or more portions of the first set of program code; and cause the subset of the tests to be executed on the second set of program code.

2. The system as recited in claim 1, wherein the test selection system is further configured to:
determine an ordered sequence for the subset of the tests, wherein the ordered sequence is determined based at least in part on an estimated likelihood of failure for the tests.

3. The system as recited in claim 1, wherein the test selection system is further configured to:
determine an ordered sequence for the subset of the tests, wherein the ordered sequence is determined based at least in part on an estimated execution time for the tests.

4. The system as recited in claim 1, wherein the test selection system is further configured to:
determine, based at least in part on the data indicative of code coverage, that a particular test does not exercise the first set of program code; and
move the particular test from the suite of tests to a suite of deprecated tests, wherein the suite of deprecated tests is excluded from consideration for the subset of the tests that are likely to exercise the second set of program code.

5. A computer-implemented method, comprising:
receiving a mapping of a suite of tests to a first set of program code, wherein data indicative of code coverage is generated using execution of the tests on the first set of program code, wherein the mapping is determined based at least in part on the data indicative of code coverage, and wherein the mapping comprises data indicative of one or more portions of the first set of program code exercised by respective tests from the suite; and
determining a subset of the tests that are likely to exercise a second set of program code that comprises one or more newly added portions, based at least in part on:
the mapping of the tests to the first set of program code,
the data indicative of one or more modified or new portions of the second set of program code, and
a determination of similarity of the one or more modified or the new portions to one or more portions of the first set of program code.

6. The method as recited in claim 5, further comprising:
determining an ordered sequence for the subset of the tests, wherein the ordered sequence is determined based at least in part on an estimated likelihood of failure for the tests.

7. The method as recited in claim 5, further comprising:
determining an ordered sequence for the subset of the tests, wherein the ordered sequence is determined based at least in part on an estimated execution time for the tests.

8. The method as recited in claim 5, further comprising:
determining, based at least in part on the data indicative of code coverage, that a particular test does not exercise the first set of program code; and
moving the particular test from the suite of tests to a suite of deprecated tests, wherein the suite of deprecated tests is excluded from consideration for the subset of the tests that are likely to exercise the second set of program code.

9. The method as recited in claim 5, further comprising:
determining, based at least in part on a test execution history, that a particular test is infrequently executed; and
moving the particular test from the suite of tests to a suite of deprecated tests, wherein the suite of deprecated tests is excluded from consideration for the subset of the tests that are likely to exercise the second set of program code.

10. The method as recited in claim 5, further comprising:
receiving a new test, wherein the new test is associated with the second set of program code; and
adding the new test to the subset of the tests that are likely to be exercised by the second set of program code.

11. The method as recited in claim 5, wherein the second set of program code comprises a newly added portion, wherein the subset of the tests comprises one or more tests that are likely to be exercised by the newly added portion, and wherein the one or more tests are determined based at least in part on a machine learning model that analyzes the similarity of the newly added portion to the one or more portions of the first set of program code represented in the mapping.

12. The method as recited in claim 5, wherein the subset of the tests is determined based at least in part on user input representing a selection of tests for prior versions of the second set of program code.

13. The method as recited in claim 5, further comprising:
executing the subset of the tests on the second set of program code.

14. A computer-readable storage medium storing program instructions computer-executable to perform:
executing a suite of tests on a first version of program code, wherein execution of a respective test from the suite generates data indicative of code coverage of the respective test with respect to the program code;
storing a mapping of the tests to the program code, wherein the mapping is determined based at least in part on the data indicative of code coverage, and wherein the mapping comprises data indicative of one or more portions of the program code exercised by respective tests from the suite;
receiving data indicative of one or more modified or new portions of a second version of the program code;
determining a subset of the tests that are likely to exercise the second version of the program code, based at least in part on:
the mapping of the tests to the program code,
the data indicative of the one or more modified or new portions of the second version of the program code, and
a determination of similarity of the one or more modified or the new portions to one or more portions of the first version of program code; and
initiating execution of the subset of the tests on the second version of the program code.

15. The computer-readable storage medium as recited in claim 14, wherein the program instructions are further computer-executable to perform:
determining an ordered sequence for the subset of the tests, wherein the ordered sequence is determined based at least in part on an estimated likelihood of failure for the tests.

16. The computer-readable storage medium as recited in claim 14, wherein the program instructions are further computer-executable to perform:
determining an ordered sequence for the subset of the tests, wherein the ordered sequence is determined based at least in part on an estimated execution time for the tests.

17. The computer-readable storage medium as recited in claim 14, wherein the program instructions are further computer-executable to perform:
- determining, based at least in part on the data indicative of code coverage, that a particular test does not exercise the first version of the program code; and
- moving the particular test from the suite of tests to a suite of deprecated tests, wherein the suite of deprecated tests is excluded from consideration for the subset of the tests that are likely to exercise the second version of the program code.

18. The computer-readable storage medium as recited in claim 17, wherein the program instructions are further computer-executable to perform:
- storing data indicative of one or more portions of the program code exercised by the particular test;
- determining that the one or more portions of the program code exercised by the particular test are reverted to a prior version for which the particular test was exercised; and
- moving the particular test from the suite of deprecated tests to the suite of tests.

19. The computer-readable storage medium as recited in claim 14, wherein, in determining the subset of the tests that are likely to exercise the second version of the program code, the program instructions are further computer-executable to perform:
- determining confidence scores for the tests, wherein the confidence scores indicate a likelihood of exercising the second version of the program code; and
- determining that the confidence scores for the subset of the tests meet a confidence threshold and that the confidence scores for other ones of the tests do not meet the confidence threshold.

20. The computer-readable storage medium as recited in claim 14, wherein the subset of the tests are executed using a continuous integration system that tests the second version of the program code.

* * * * *